United States Patent [19]

Morrison

[11] 4,062,348

[45] Dec. 13, 1977

[54] PHOTOCHEMICAL THERMAL-ENERGY PROCESS AND GENERATOR

[76] Inventor: Robert Peter Morrison, Pheasant Run Apts., Harleysville, Pa. 19438

[21] Appl. No.: 718,342

[22] Filed: Aug. 27, 1976

[51] Int. Cl.² .................................................. F24J 3/02
[52] U.S. Cl. ..................................... 126/270; 250/527
[58] Field of Search .......................... 204/157.1 R; 219/10.55 R, 10.55 M, 10.57; 250/527; 126/270, 271

[56] References Cited

U.S. PATENT DOCUMENTS

| | | | |
|---|---|---|---|
| 3,858,051 | 12/1974 | Smith | 250/527 |
| 3,960,135 | 6/1976 | Angilletta | 126/270 |
| 3,960,136 | 6/1976 | Moan et al. | 126/271 |

*Primary Examiner*—Howard S. Williams

[57] ABSTRACT

A system and an apparatus expose a trapped gas to light, the gas being one which is dissociated by the light from a molecular state to an excited atomic state and which generates heat on reconversion of the excited atomic gas to its molecular state upon contact with a third body entrapped with the gas, the generated heat being transmitted for use.

9 Claims, 3 Drawing Figures

PHOTOCHEMICAL THERMAL-ENERGY PROCESS AND GENERATOR

This invention relates to energy sources and particularly to apparatus and methods for obtaining useful energy from sunlight. The basic feature of the invention is that a system is provided which utilizes a photochemical reaction to receive light rays from the sun, to transform it to heat energy and deliver heat in a useful form.

Sunlight is now being seriously considered as a source of energy but all the systems based on this utilization are either photoelectric or photothermal in nature. As to the latter, the systems make use of the heat energy which is generated or developed in a body which is exposed to sunlight. For instance, water is flowed through connected pipes or panels which are preferably located in areas of maximal annual sunshine. The water which flows through the pipes or panels is heated and it is used to heat a house or a building, for example.

Another sunlight system directs the sun's rays to a Sterling engine to supply the necessary heat. This engine is an external combustion type engine and sunlight is an inexpensive source of heat energy to supply the necessary heat.

These photothermal systems abstract only a part of the total energy in the sunlight falling on the area. Some of the heat is lost in transmission through the absorbing walls and some of the heat is reflected back to the atmosphere. Attemps are made to augment or concentrate the sunlight by using mirrors to reflect the sunlight from a large area onto a small area but the useful energy which is obtained is small in view of the costs of the systems.

Photoelectric systems are similarly inefficient. The cells which are required to convert sunlight energy into electrical energy are very large in comparison to their wattage output. An enormous exposure area would be required to supply the volt amperes of a modest home.

Hydroelectric plants are efficient sources of energy but there are a limited number of places which provide the necessary hydraulic head. Fossil fuels are the main sources of energy but the supply is limited as they are not replenishable. Coal and oil must be regarded as a diminishing energy resources. Nuclear reactors are extremely expensive to build and they present a serious problem in the disposal of the spent, waste material. Moreover, the supply of the radioactive material is limited.

The need for an energy source which will satisfy human needs is apparent. The photochemical system of the present invention offers another solution to this important problem. As is stated above, the energy conversion of the photochemical system yields a significant amount of useable energy, without the complications of undesirable secondary reactions. Thermodynamic studies which have been made and reported concerning the physical-chemical changes brought about by the absorption of light by gases, indicate the practical nature of the system of this invention.

It is known that light in the spectral region imparts energy to certain gases which results in their molecular excitation and dissociation. The absorbed sunlight energy converts the gas molecules to atoms which are free radicals. The free, atomic gas radicals are said to be in an excited state. Using chlorine gas for illustration purposes, the reaction may be expressed by the equation:

$$Cl_2 + \text{absorbed light} \rightarrow Cl^* + Cl^* \tag{1}$$

in which $Cl^*$ represents the excited state of a chlorine free radical.

This dissociation is not brought about by the heat of the sunlight nor by an elevation in the temperature of the gas, since, if this were true, ordinary externally applied heat would effect the conversion from $Cl_2$ to $2Cl^*$ and this does not occur. The change from the molecular chlorine gas to the free radical atomic chlorine gas is said to be due to a photolysis of the gas. Only the light which is directlly absorbed by the molecular gas brings about this photolysis.

This photolysis of the molecular gas to produce $Cl^*$, i.e., atomic chlorine in an excited state, involves the absorption of only a small amount (a quanta) of sunlight energy. The energy source which is the feature of this invention is based on the principle that the absorption by the molecular gas of a small amount of light produces in the excited state of the atomic gas, a tremendous capacity for the release of heat energy. This generation of energy, is due to the secondary processes which follow photoexcitation. The thermodynamic explanation for this phenomena is not fully known but it probably lies in the orbital displacement of the electrons of the gas atomic structure. It is known that the vibrational displacement of atomic electrons from their orbital spheres gives rise to the emission of light and this same energy may be the basis for the release of energy by the present system.

The photoexcitation often depends on the frequency of the absorbed light and it may be necessary, to obtain the maximum energy yield, to use monochromatic light. Glass, gelatinous film, or plastic optical filters, e.g., impregnated with dye, may be interposed in the sunlight path so that by an additive, absorptive or subtractive action only the desired wavelength or wavelengths will pass on the molecular gas in the energy producing system. Or, only the visible rays, 3900–7600 A, may be transmitted to the gas. The invention includes the use in the system, as well, of substances which when exposed to the sunlight, fluoresce in the wavelength of light which produces the photosensitized reaction and, thereby, the excited state free radicals. Fluroescein is one example.

The recoverable energy of the system is produced when the free gas radicals combine back to the molecular state in the presence of a third body. This reaction occurs almost instantaneously after the above reaction (1) takes place. The recombining reaction is expressed by the equation:

$$Cl^* + Cl^* + M \rightarrow Cl_2 + M + \Delta \tag{2}$$

where M is any third body and $\Delta$ represents produced heat. As has been stated above, this heat which is released when the excited chlorine atoms recombine to form molecular chlorine is equivalent to the heat of fusion; i.e., chlorine—57 kcal/mole, bromine—45 kcal/mole. The invention recovers this released heat so that is is put to a useful purpose.

Chlorine has been selected in the above description for illustration purposes but other halides such as bromine and iodine may be used as well. Iodine absorbs white light, but at slightly elevated temperatures (~200° F.). It is important that the gas be absolutely dry to prevent hydrolysis and unwanted corrosive reactions. As the reactions (1) and (2) make it clear that the system is a self-contained reversible one, it is apparent that no renewal or replacement of the reactants is necessary. Neither the gas nor the third body represented by M becomes spent nor poisoned by the repetative reactions (1) and (2). Moreover, the process is self initiating on exposure to light and it ceases in darkness.

The third body M may be one of a variety of materials. As will appear from the following description of a suitable apparatus, the third body may be the tubing which serves as a heat exchanger to transfer the heat out of the reaction system. It may be the vessel walls and in such an apparatus they would need to be jacketed to recover the heat generated on the inner surfaces. The third body could be increased by the introduction of an inert gas, i.e., argon, into the pre-evacuated reaction vessel with chlorine.

A preferred apparatus is illustrated in the accompanying drawing for carrying out the process and the system of the invention. In the drawings.

The hollow vessel within which the reactions take place can have a variety of shapes, as it could be a cube or a sphere for instance. It could be a cylinder disposed on a horizontal or a vertical axis. A preferred vessel construction is shown in the drawngs as having flat walls as this simplifies the attachments to some of its outside surfaces. Other possible structures will be apparent from a detailed explanation of the illustrated vessel.

Figure 1:
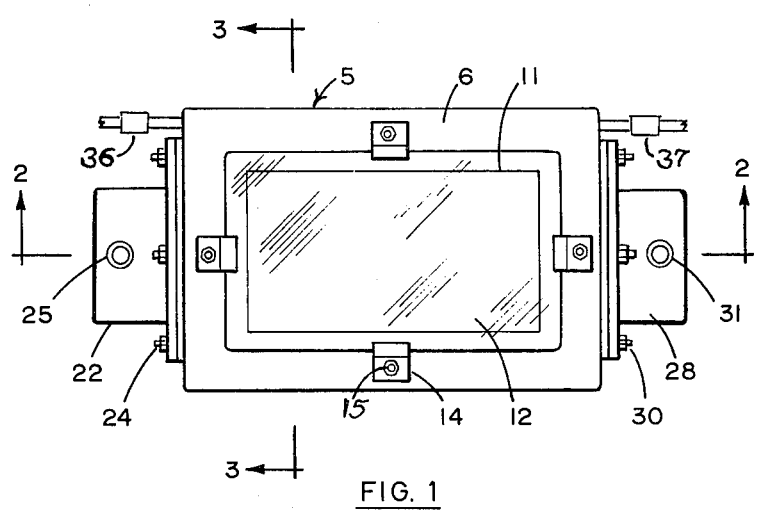
FIG. 1 is a plan view of the apparatus.
Figure 3:
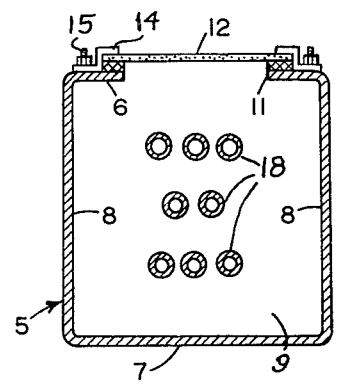
FIG. 3 is a sectional view on the line 3—3 of FIG. 1.
Figure 2:
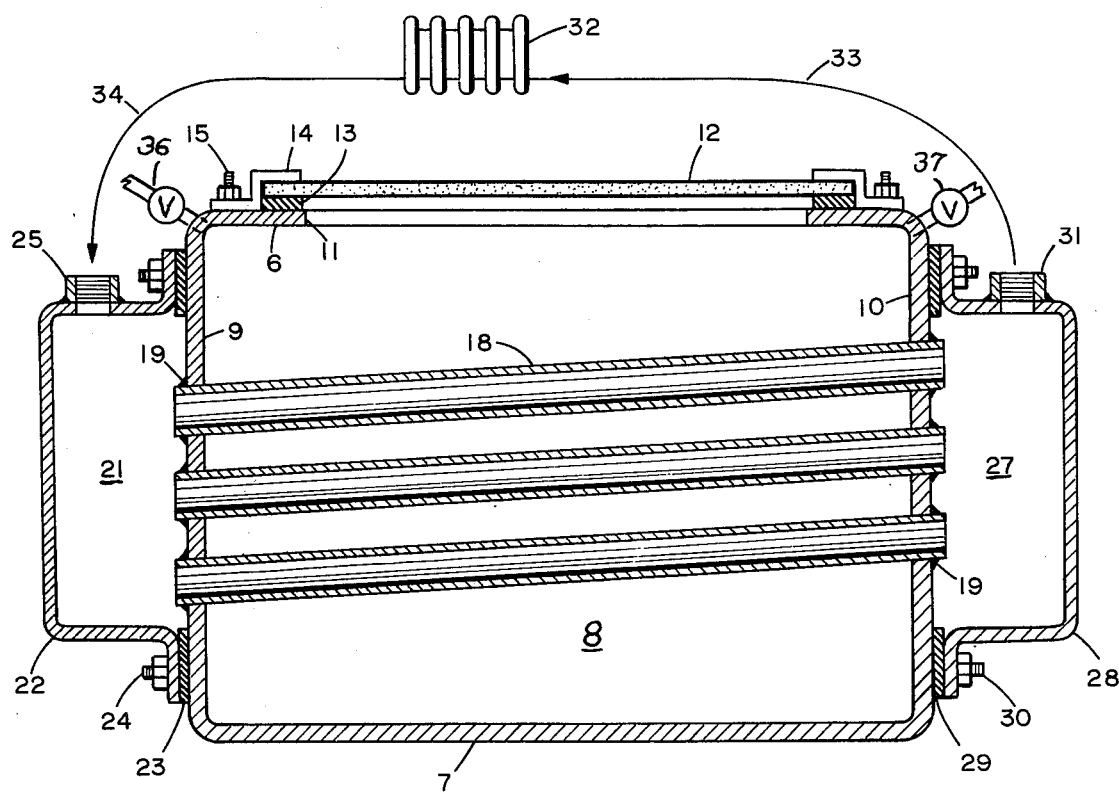
FIG. 2 is a vertical sectional view on the line 2—2 of FIG. 1 on an enlarged scale.

The vessel 5 is generally square in cross section as is shown in FIG. 3 and is elongated as is shown in FIG. 1. It has the top wall 6, the bottom wall 7, the two side walls 8, the end wall 9 and the end wall 10. These walls may be made out of stainless steel or other metal and the walls are welded together at their meeting edges to form seams so that a pressure tight vessel results. The side walls 8 are longer than they are high but as is stated above the proportions are not important. The top wall 6 has an opening or hole 11 through it and overlying it is the glass or plastic sheet 12, which transmits exterior light into the interior of the vessel. Interposed between the light transmitting sheet 12 and the rim around the hole 11 is a gasket 13 to seal the exterior from the interior of the vessel. The sheet 12 is firmly held down on the upper wall by a series of clamps 14 which are bolted down against the vessel by studs 15 which are threaded into the top wall 6.

Within the vessel are tubes 18 which pass from the end wall 9 to the opposite end wall 10. At their ends they pass through holes in the walls 9 and 10 and they are sealed in these walls against leakage by welding as indicated at 19 or by expanding the ends of the tubes into leak proof contact with the edges of the walls at the holes. The tubes can be made of copper, aluminum, stainless steel and other metals which will readily pass heat and which will not corrode.

A chamber 21 is formed at the ends of the tubes 18 on the outside of the wall 9, by a concave jacket 22. A gasket 23 is interposed between the jacket 22 and the wall 9 for sealing purposes and the jacket 22 is held in place by the studs 24 which are threaded in the end wall 9. The chamber 21 within this jacket 22 is, of course in open communication only with the interior of the tubes 18, but not with the interior of the vessel. At the top of the jacket 22 is a bored hub 25 which is internally threaded to receive a pipe.

A similar chamber 27 is formed at the ends of the tubes 18 on the outside of the wall 10, by a similar concave jacket 28. The gasket 29 and the studs 30 form a tight seal, as described above. An internally threaded hub 31 is provided to receive a pipe.

The pipes 18 slant upwardly from the wall 9 to the wall 10 so that the water or other liquid in the pipes will, on being heated, tend to flow upwardly from wall 9 to wall 10. To indicate one possible use of the invention, an ordinary household hot water radiator is shown at 32. The line 33 represents a delivery pipe from the outlet opening 31 to the radiator and the line 34 represents a return line from the radiator to the inlet opening 25. When the water in the tubes 18 is heated, the thermosiphon effect will cause the heated water to pass into the chamber 27, out of the opening 31, through delivery pipe 33, through radiator 32, and return through pipe 34 and opening 25 into the chamber 21 for reentry in the pipes 18 where the water will again be reheated.

The water in the pipes 18 is heated by the heat that is generated on the outsides of the tubes by the photochemical reactions described above. To initiate this, the interior of the vessel 5 is fully scavenged with chlorine gas, for instance, making sure that it is dry and the interior of the vessel is dry. The gas may be at atmospheric pressure when the vessel is sealed by the studs 15 but the gas may be within 5 lbs./sq. in. up to 250 lbs./sq. in., absolute, but the system is not to be restricted to these pressure limits.

Exposure of the transparent sheet 12 to light or sunlight will bring about the reaction (1) which has been described above. The excited gas atoms which are thereby formed will come into contact with the surfaces of tubes 18 and the reaction (2) will take place with the liberation of heat. This heat will be transmitted through the walls of the tubes and heat the water therein. The total external area of all the tubes should be greater than the area of the internal surface of the vessel walls so that most of the heat is formed on the tubes.

As long as light, preferably sunlight, passes through the sheet 12, the reactions (1) and (2) will continue since they are reversable and no other source of external energy is required. The heat energy output of the system is derived from the photochemical reaction due to light which enters the vessel and not from direct absorption of light as heat, thus, the system provides a novel way of getting heat energy from the sun's rays. If the light transmitting sheet 12 is a filter so that only green light passes through it, and if the gas is chlorine, a greater output of energy is obtained than if the transmitting sheet is clear and passes all spectral colors.

Important aspects of the reaction vessel may be summarized as follows:

1. Vessel must be totally sealed, so as to be airtight and stable at elevated temperatures and pressures.
2. Vessel construction should facilitate evacuation, dessication and introduction of dry chlorine or bromine gas, and possibly another dry, inert gas such as argon.
3. Vessel should be designed with heat-transfer tubes and/or jacket, through which a heat transfer liquid, such as water, may pass to collect heat.

It is reasonable and practical to design the tubes so that steam will be generated. This may readily be accomplished by replacing all of the tubes 18 with a single coiled tube which is long enough so that the total heat which is generated on the tube will turn the entering water into steam, the water being pumped into the entering end of the tube.

Another variation of the apparatus and system of the invention is to replace the tubes 18 with one or more so called heat pipes which are sealed in the wall of the vessel 5 so that a part of each pipe is inside the vessel and a part of it is outside of it. The part inside serves as the third body M for reaction (2) and receives the heat which is generated. The heat pipe transmits in the known efficient manner, the generated heat to the outside of the vessel where it can be used, for example, to supply the heat to operate a Sterling engine.

The above specific description of the illustrated vessel 5 states that its walls are made of a metal but this is not necessary as the vessel may be made of glass or a plastic. Plastic is particularly useful as it can be easily molded to the desired shape and produces an inexpensive product. The vessel material must be strong enough to resist the internal increase in pressure due to the rise in temperature of the gas during operation.

Irrespective of the material which is used, the vessel should have a valved inlet 36 and a valved outlet 37 so that the interior can be easily flushed and dried out and be filled with the selected reaction gas and, if desired, an inert gas, which would be identified as M. The reaction gas can be a mixture of the halogens as it is not necessary that a single reactive gas be used.

Other variations in the use of the apparatus are obvious. For example, instead of water in the circuit which includes the tubes 18, another fluid may be used. Or, air may be in the tubes 18 and chambers 21 and 27, and the hot air can flow through tube 33 into a room to heat it and the pipe 34 can be a return duct from the room.

I claim:

1. The method of generating thermal energy by a photochemical process which comprises exposing a gas which is enclosed in a sealed vessel to light, said gas being selected from the group which consists of chlorine, bromine and iodine and which is dissociated by light from a molecular state to an excited atomic state and which on contact with a third body is reconverted to a molecular state with the production of heat, presenting a third body inside the sealed vessel with which the gas atoms in the excited state come in contact and thereby produce heat on reconversion of the gas to the molecular state, and transmitting the heat from said third body to the outside of the vessel.

2. The method of generating thermal energy by a photochemical process which comprises exposing a gas which is enclosed in a sealed vessel to light, said gas being selected from the group which consists of chlorine, bromine and iodine and which is dissociated by light from a molecular state to a free radical state and which on contact with a third body is reconverted to a molecular state with the production of heat, presenting a third body inside the sealed vessel with which the gas atoms in the free radical state come in contact and thereby produce heat on reconversion of the gas to the molecular state, and transmitting the heat from said third body to the outside of the vessel.

3. The method of claim 1 in which said light is monochromatic.

4. The method of claim 1 in which said light is the visible range of 3900–7600 A.

5. The method of claim 1 in which an inert gas is also enclosed in said vessel.

6. The method of claim 1 in which a fluorescent material is also enclosed in said vessel and which emits visible light on exposure to sunlight.

7. Apparatus for generating thermal energy from light by a photochemical process which comprises a sealed vessel at least a portion of its wall being of light transmitting material, a gas enclosed within said vessel which is selected from the group which consists of chlorine, bromine and iodine and which is dissociated by light from a molecular state to an excited atomic state such that on contact with a third body the atomic gas will be reconverted to its molecular state with the production of heat, a third body inside said vessel which said excited atomic gas contacts and which is heated by the reconversion of the excited atomic gas to its molecular state, and means for transmitting the heat from said third body to the outside of the vessel.

8. The apparatus of claim 7 in which said heat transmitting means includes at least one heat transfer element which is sealed in the wall of the vessel.

9. The apparatus of claim 7 in which said light transmitting material of the wall is a sheet which transmits visible light and which is sealed against the remaining wall of the vessel.

* * * * *

UNITED STATES PATENT OFFICE
CERTIFICATE OF CORRECTION

Patent No. 4,062,348            Dated December 13, 1977

Inventor(s) Robert P. Morrison

It is certified that error appears in the above-identified patent and that said Letters Patent are hereby corrected as shown below:

On the Cover Sheet Item [76] the Inventor's address should read:

--- 593 Upper Gulph Road, Strafford, PA 19087 ---.

Signed and Sealed this

*First* Day of *August 1978*

[SEAL]

*Attest:*

RUTH C. MASON
*Attesting Officer*

DONALD W. BANNER
*Commissioner of Patents and Trademarks*